(12) United States Patent
Guiney et al.

(10) Patent No.: US 8,174,763 B2
(45) Date of Patent: May 8, 2012

(54) METHODS AND SYSTEMS FOR CONTROLLABLY SCANNING A CYTOLOGICAL SPECIMEN

(75) Inventors: Patrick Guiney, Concord, MA (US); Douglas A. Tenney, North Reading, MA (US)

(73) Assignee: CYTYC Corporation, Marlborough, MA (US)

( * ) Notice: Subject to any disclaimer, the term of this patent is extended or adjusted under 35 U.S.C. 154(b) by 650 days.

(21) Appl. No.: 12/335,390

(22) Filed: Dec. 15, 2008

(65) Prior Publication Data

US 2009/0168160 A1    Jul. 2, 2009

Related U.S. Application Data

(60) Provisional application No. 61/017,140, filed on Dec. 27, 2007.

(51) Int. Cl.
*G02B 21/26* (2006.01)
(52) U.S. Cl. .......................................... 359/391
(58) Field of Classification Search ................... 359/391
See application file for complete search history.

(56) References Cited

U.S. PATENT DOCUMENTS

| 4,503,555 | A | * | 3/1985 | Brimhall et al. ............. 382/109 |
| 5,557,456 | A | | 9/1996 | Garner et al. |
| 5,684,627 | A | | 11/1997 | Ganser et al. |
| 5,828,198 | A | | 10/1998 | Engelse et al. |
| 6,545,264 | B1 | * | 4/2003 | Stern ............................ 250/234 |
| 7,083,106 | B2 | | 8/2006 | Albany |
| 2004/0254738 | A1 | | 12/2004 | Zahniser et al. |
| 2006/0133657 | A1 | | 6/2006 | Schmid et al. |
| 2007/0091425 | A1 | * | 4/2007 | Kawano ......................... 359/385 |
| 2007/0139638 | A1 | | 6/2007 | Wolpert et al. |
| 2008/0239474 | A1 | * | 10/2008 | Fox et al. ...................... 359/384 |

FOREIGN PATENT DOCUMENTS

| DE | 3824547 A1 | 1/1990 |
| GB | 2334112 A1 | 8/1999 |
| WO | 2007022961 A1 | 3/2007 |

OTHER PUBLICATIONS

PCT International Search Report and Written Opinion of the International Searching Authority for PCT/US2008/086861, Applicant Cytyc Corporation, Forms PCT/ISA/210, 220 and 237, dated May 28, 2009 (14 pages).
Office Action for Related CN Application No. 200880122661.4, filed on Dec. 15, 2008, mailed on Jun. 15, 2011, with Translation (9 pages).

\* cited by examiner

*Primary Examiner* — Frank Font
(74) *Attorney, Agent, or Firm* — Vista IP Law Group LLP

(57) ABSTRACT

Methods and systems for scanning a cytological specimen carried by a slide. Movement or positioning of a motorized stage of an automated screening system may be controlled manually by a user such that the user controls movement, e.g., controlling speed, position, and/or timing, of the motorized stage along a first scan line to controllably scan a first portion of the specimen along the scan line. The user may then index the motorized stage from the first scan line to the next scan line and manually control movement of the stage along the second scan line to controllably scan another portion of the specimen. Stage indexing may also be automatic such that the user does not control or initiate indexing.

5 Claims, 17 Drawing Sheets

Scan (1)
Roam (2-6)
Return to Scan (7)

METHODS AND SYSTEMS FOR CONTROLABLY SCANNING A CYTOLOGICAL SPECIMEN

RELATED APPLICATION DATA

The present application claims the benefit under 35 U.S.C. §119 to U.S. provisional patent application Ser. No. 61/017,140, filed Dec. 27, 2007. The foregoing application is hereby incorporated by reference into the present application in its entirety.

FIELD OF THE INVENTION

The present inventions are related to controlling automated microscopes and, more particularly, to controllably scanning a cytological specimen using an automated microscope.

BACKGROUND

In the medical industry, there is often a need for a laboratory technician, e.g., a cytologist or other user, to review a cytological specimen for the presence of specified cell types. A typical cytological technique is a "Pap smear" test, which involves scraping cells from a woman's cervix and analyzing the cells in order to detect the presence of abnormal cells, a precursor to the onset of cervical cancer. Cytological techniques are also used to detect abnormal cells and diseases in other parts of the human body.

Acquired cytological samples are often placed in solution and subsequently collected and transferred to a glass slide for viewing under magnification. Fixative and staining solutions are typically applied to cells on the glass slide, often called a cell smear, for facilitating examination and for preserving the specimen for archival purposes. Prepared specimens are examined using a microscope, such as the microscope 100 generally illustrated in FIGS. 1A-B, which includes a stage 110 having a surface 112 that supports a specimen slide 200 having a biological specimen 202 (e.g., as shown in FIG. 2).

One or more control knobs are provided to allow the user to move the stage 110. As shown in FIGS. 1A-B, the microscope 100 may include a coaxial control knob 120 including a first knob 121 for moving the stage 110 in one direction (e.g., x direction) and a second knob 122 coaxial with the first knob 121 for moving the stage 110 in a different direction (e.g., y direction). A light source 130, such as a tungsten-halogen light source, is positioned below the stage 110 to illuminate the specimen 202. Objective lenses 140 form a magnified image of the specimen 202, and a cytologist may view the magnified image through an ocular lens 150. Focus adjustments are made using a focus control 160, which may include coaxial focus knobs 161, 162 (e.g., for coarse and fine focus), which move the stage 110 vertically (e.g., z direction). Further aspects of microscope components are described in U.S. Publication No. 2007/0139638 A1, the contents of which are incorporated herein by reference.

Machine vision devices and automated systems have also been utilized to acquire and analyze images of biological specimens. One known automated system 300, shown in FIG. 3, includes an automated imaging microscope or station 310, a processing server 320, and an automated review station 330.

The imaging station 310 includes a camera 312 for acquiring images of the specimen 202 viewed through an imaging microscope 316. With further reference to FIG. 4, the motorized stage 314 may include, or be operably coupled to, a stage control component or module 400 that includes one or more motors 402 and associated electronic components such as a processor 404 and memory 406, which are used to control the motors 402 and the position of the stage 314 and slide 200 thereon. Referring again to FIG. 3, image data 318 generated by the camera 312 is provided to the server 320 that includes one or more processors 321-323 (generally referred to as processor 321) and memory 324 for processing image data 318 and storing results that are provided to the review station 330.

In some automated screening systems, the processor 321 delineates between normal and abnormal (or suspicious) biological material within each specimen 202. That is, the processor 321 uses diagnostic information to determine the most pertinent biological objects and their locations (e.g., x-y coordinates) on the slide 200. In one system, the server 320 processes image data 318 to identify "objects of interest" (OOIs) in the image data 318. OOIs may take the form of individual cells and cell clusters of the specimen 202. One or more OOIs can be organized within a defined boundary or fields of view of Fields of Interest (FOI), which may be defined by various geometries to include different numbers of OOIs. FOIs may be identified based on (x,y) coordinates. One known automated system identifies 22 FOIs, or 22 sets of (x,y) coordinates. Further aspects of OOIs and FOIs are described in U.S. Pat. No. 7,083,106 and U.S. Publication No. 2004/0254738 A1, the contents of which are incorporated herein by reference.

The processor 321 may be configured to rank identified OOIs, e.g., based on the degree to which certain cells or objects are at risk of having an abnormal condition such as malignancy or pre-malignancy. For example, a processor 321 may evaluate OOIs for their nuclear integrated or average optical density, and rank the OOIs according to optical density values. The OOI and FOI coordinate information may be stored for subsequent processing, review or analysis using the review station 330.

When a cytologist reviews a slide 200 using a review microscope 336 and motorized stage 334, the OII/FOI location information is provided to the review microscope 336, which automatically steps through the previously identified FOIs to present OOIs to the cytologist. In one automated system, the review station 330 includes a mouse-like joystick that is used to navigate the slide 200. For example, one system includes "NEXT" and "PREVIOUS" buttons that are used to navigate the next FOI and the previous FOI.

During specimen review, if the cytologist does not identify any suspicious cells, then that slide is considered normal. In this case, it is not necessary to scan the entire cell spot 202. However, if the cytologist identifies suspicious cells or OOIs within a FOI, the cytologist can electronically mark those OOIs by pressing a "MARK" button, and must scan the entire specimen or cell spot 202 before completing slide review.

FIG. 5 shows one manner in which the entire cell spot 202 may be scanned using a serpentine scan pattern. In the illustrated example, the scan starts at the beginning 502a (generally referred to as beginning 502) of a first scan line or chord 500a (generally referred to as "scan line 500"), traverses across a first portion of the cell spot 202 at certain positions 510 (represented as dots) on the first scan line 500a (e.g., moving left to right in the illustrated example), and beyond the cell spot 202 boundary 204 (to ensure that the entire length or width of the cell spot 202 is scanned) to the end 503a (generally referred to as end 503) of the first scan line 500a. The automated system indexes 520a down to the second or next scan line 500b such that a second portion of the cell spot 202 may be scanned (e.g., right to left) from the beginning 502b to the end 503b of that scan line 502b, at which point it is indexed 520b again to the beginning 502c of the next scan line 500c, and so on, to scan 100% of the cell spot 202.

For purposes of scanning, known automated systems include a motorized stage 334 that positions the cell spot 202 for scanning and review by the cytologist. In a first scan mode, the motorized stage 334 and slide 200 move continuously along a pre-determined scan line 500 (e.g., as shown in FIG. 5), in a manner similar to a slow moving picture. In a second scan mode, the motorized stage 334 is controlled to move the slide 200 to positions 510 on a scan line 500, and pauses at each of position 520 for a pre-determined amount of time before moving to the next position 510, pausing again, moving again, and so one for each position 510 on each scan line 500. In a third scan mode, the stage 334 and slide 200 are moved to fixed positions 510 on a scan line 500 and remain at that position 510 until the user presses a button (e.g., the "NEXT" button used for review control), to move to the next position 510 on a scan line 500.

While automated scanning modes have been used effectively, they have a number of limitations and restrictions and can be improved. Significantly, they provide very limited, if any, user control or input over the scanning parameters. For example, in the first mode mentioned above, the stage and slide move continuously, and only the speed at which the stage and slide are moved can be adjusted using a joystick. In the second scan mode described above, the scan proceeds regardless of the desire or input of the user, and in the third scan mode, the control by the user is limited to pressing a button to advance to the next position.

Thus, certain scan modes of known automated screening systems do not permit the user to select when to stop or pause the scan, change scan directions, and/or move the scan position to view a different portion of the specimen that is not on the current scan path. Moreover, in certain known systems, a user may not be able to stop or pause at a particular position for a desired amount of time but instead is moved onto the next position if too much time has passed. Further, known systems do not provide control adjustments that can be made on-the-fly. Additionally, in certain known systems, scanning progresses in strict ordered and forward manner such that scanning is advanced. Thus, known systems are unidirectional and do not permit users to go back and review a previously reviewed portion. Known automated scanning systems, therefore, provide limited control and flexibility.

These scanning control restrictions may be so limiting and inconvenient that a user may be required to employ a separate conventional manual microscope to review a selected portion of a specimen.

SUMMARY

One embodiment is directed to a method of scanning a cytological specimen that includes manually controlling movement of a motorized stage supporting a slide including the cytological specimen along a first scan line to controllably scan a first portion of the cytological specimen along the first scan line, manually indexing the motorized stage from the first scan line to a second scan line, and manually controlling movement of the motorized stage along the second scan line to controllably scan a second portion of the cytological specimen along the second scan line.

Another embodiment is directed to a method of scanning a cytological specimen that includes manually controlling movement of a motorized stage supporting a slide including the cytological specimen along a first scan line to controllably scan a first portion of the cytological specimen along the first scan line, automatically indexing the motorized stage from the first scan line to a second scan line, and manually controlling movement of the motorized stage along the second scan line to controllably scan a second portion of the cytological specimen along the second scan line.

According to another embodiment, a system for scanning a cytological specimen includes a motorized stage, a processor and a scan controller. The motorized stage is configured to support a cytological specimen slide, the processor is operably coupled to the motorized stage and the scan controller is operably coupled to the processor. The motorized stage, the processor, and the scan controller are configured such that manipulation of the scan controller provides manual control of movement of the motorized stage along a first scan line to controllably scan a first portion of the cytological specimen slide along the first scan line, manual indexing of the motorized stage from the first scan line to a second scan line, and manual control of movement of the motorized stage along the second scan line to controllably scan a second portion of the cytological specimen slide along the second scan line.

A further alternative embodiment is directed to a system for scanning a cytological specimen that includes a motorized stage, a processor and a scan controller. The motorized stage is configured to support a cytological specimen slide, the processor operably coupled to the motorized stage and the scan controller is operably coupled to the processor. The motorized stage, the processor and the scan controller are configured such that manipulation of the scan controller provides manual control of movement of the motorized stage along a first scan line to controllably scan a first portion of the cytological specimen along the first scan line and manual control of movement of the motorized stage along a second scan line to controllably scan a second portion of the cytological specimen along the second scan line, the processor and the scan controller being further configured such that the motorized stage is automatically indexed from the first scan line to the second scan line.

In one or more embodiments, movement of the motorized stage is manually controlled along the respective first and second scan lines by manually controlling a direction in which the motorized stage is moved. For example, movement of the motorized stage may be manually controlled in a first direction along the first scan line and manually controlled in a second, opposite direction, along another scan line. In one or more embodiments, the motorized stage may be controlled to move in a discontinuous manner and may be temporarily paused at a selected position on one of the scan lines. Further, the speed at which the motorized stage is moved may be manually controlled.

In one or more embodiments, the motorized stage is manually indexed from an end of the first scan line to a beginning of the second scan line. For example, in one or more embodiments, stage movement can be manually controlled by manipulating a coaxial controller, which may include a first rotary control element and a second rotary control element coaxial with the first rotary control element. The first rotary control element can be rotated to manually control movement of the motorized stage along the first and second scan lines, and the second rotary control element can be rotated to manually index the motorized stage to another scan line. For this purpose, one rotary control element can be disabled during manipulation or operation of the other rotary control element. The motorized stage may also be manually indexed from an end of the first scan line to a beginning of the second scan line using the coaxial controller.

The second rotary control element may be disabled, e.g., by a processor, during manual control of stage movement with the first rotary control element. Upon or after detecting that the motorized stage has been manually positioned at an end of the first scan line, the previously disabled second rotary control element can be enabled such that the motorized stage can then be indexed from the first scan line to the second scan line by rotation of the second rotary control element, during which time the first rotary control element may be disabled. The second rotary control element may then be disabled after detecting that the motorized stage has been indexed to the next or second scan line.

Further, in one or more embodiments, a review control may be activated by the user or operator to temporarily suspend scanning of the cytological specimen and allow the operator to roam different portions of the specimen by allowing the motorized stage to be manually moved from a current position, which can be stored to memory for later use, to another position to review a selected portion of the cytological specimen, such as an object of interest, using the review control. After roaming has been completed, scanning may be re-activated, e.g. by a processor, and the motorized stage is re-positioned at the stored positioned where scanning was temporarily paused, such that manual control of stage movement to scan along a scan line may be resumed. A review control may also be used to manually index the motorized stage to another scan line, or indexing may be automatic.

In one or more embodiments involving automatic indexing, the motorized stage may be automatically indexed from an end of the first scan line to a beginning of the second scan line, and the direction and speed of the stage can be manually controlled. The stage may also be temporarily paused at a selected location. Thus, the motorized stage may be moved in a discontinuous manner.

In one or more embodiments, a processor is configured to disable one of the rotary control elements of a rotary controller during use of the other rotary control element. For example, the processor may be configured to detect that the motorized stage has been manually positioned at an end of the first scan line and enable the previously disabled second rotary control element such that the second rotary control element is rotatable to index the motorized stage from the first scan line to the second scan line.

In one or more embodiments, a review controller is operably coupled to the processor, and the scan controller is a review controller that includes at least one button that can be pressed to manually index the motorized stage or temporarily suspend scanning of the cytological specimen at a current motorized stage position to allow manual review of selected portion of the cytological specimen at another motorized stage position.

BRIEF DESCRIPTION OF THE DRAWINGS

Referring now to the drawings in which like reference numbers represent corresponding parts throughout and in which.

DETAILED DESCRIPTION OF ILLUSTRATED EMBODIMENTS

Embodiments relate to methods and systems for allowing a user to controllably scan a cytological specimen of an automated screening system in a more effective, user-friendly, convenient and efficient manner, while remaining capable of achieving 100% cell spot coverage.

Figure 3:
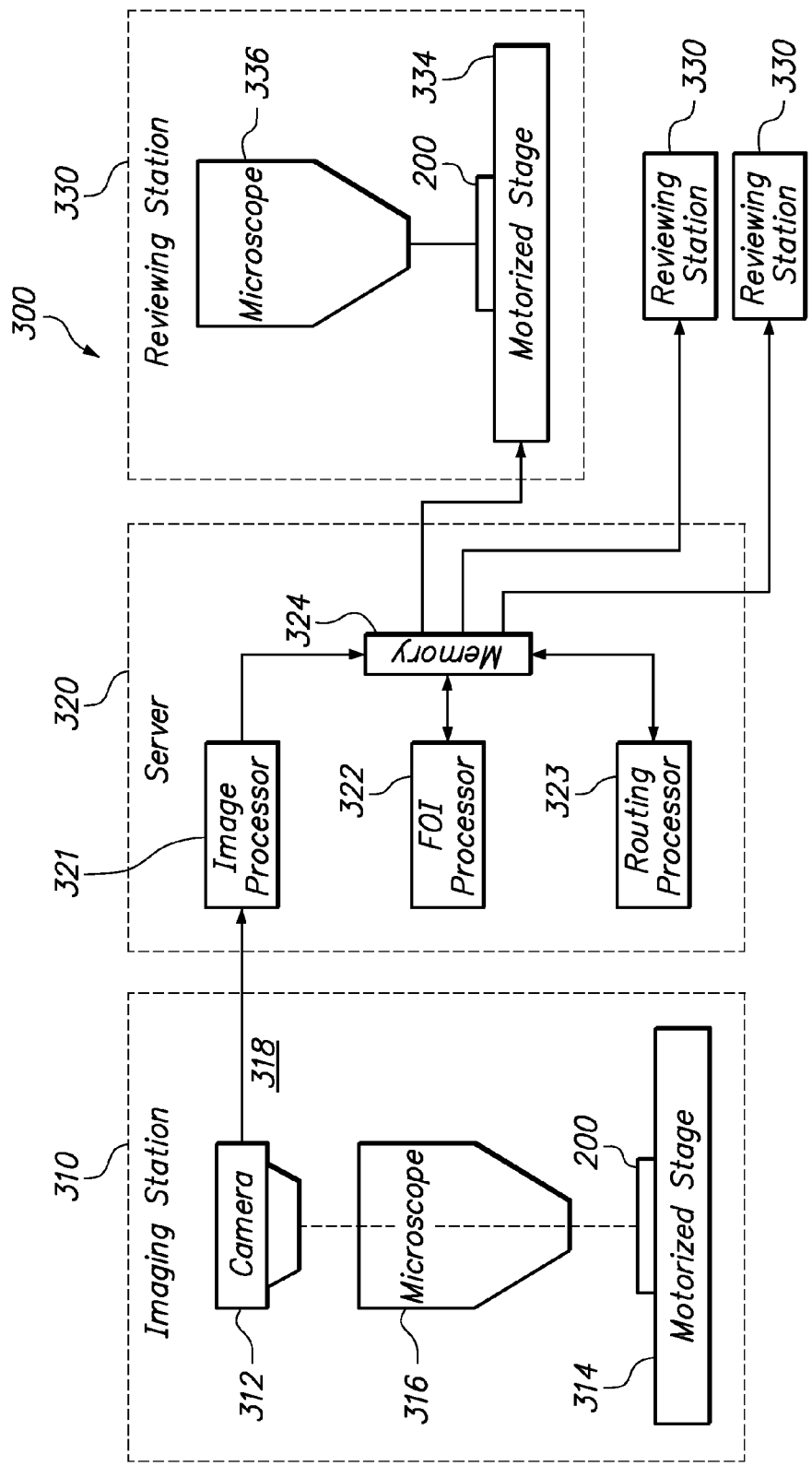
FIG. 3 schematically illustrates a known biological specimen imaging and review system.
Figure 4:
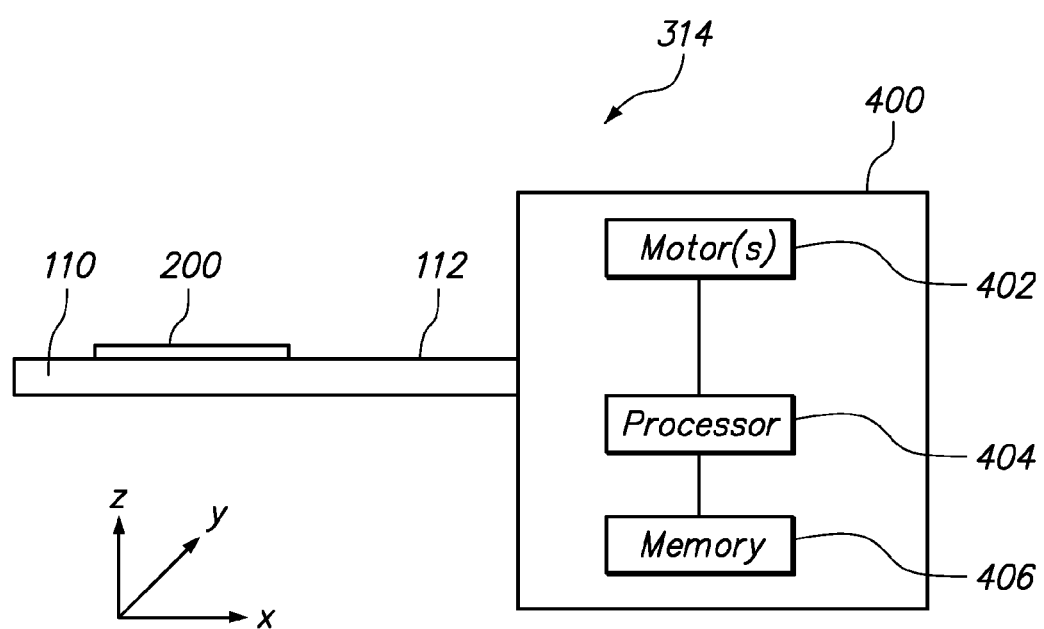
FIG. 4 schematically illustrates components of a motorized stage.
Figure 5:
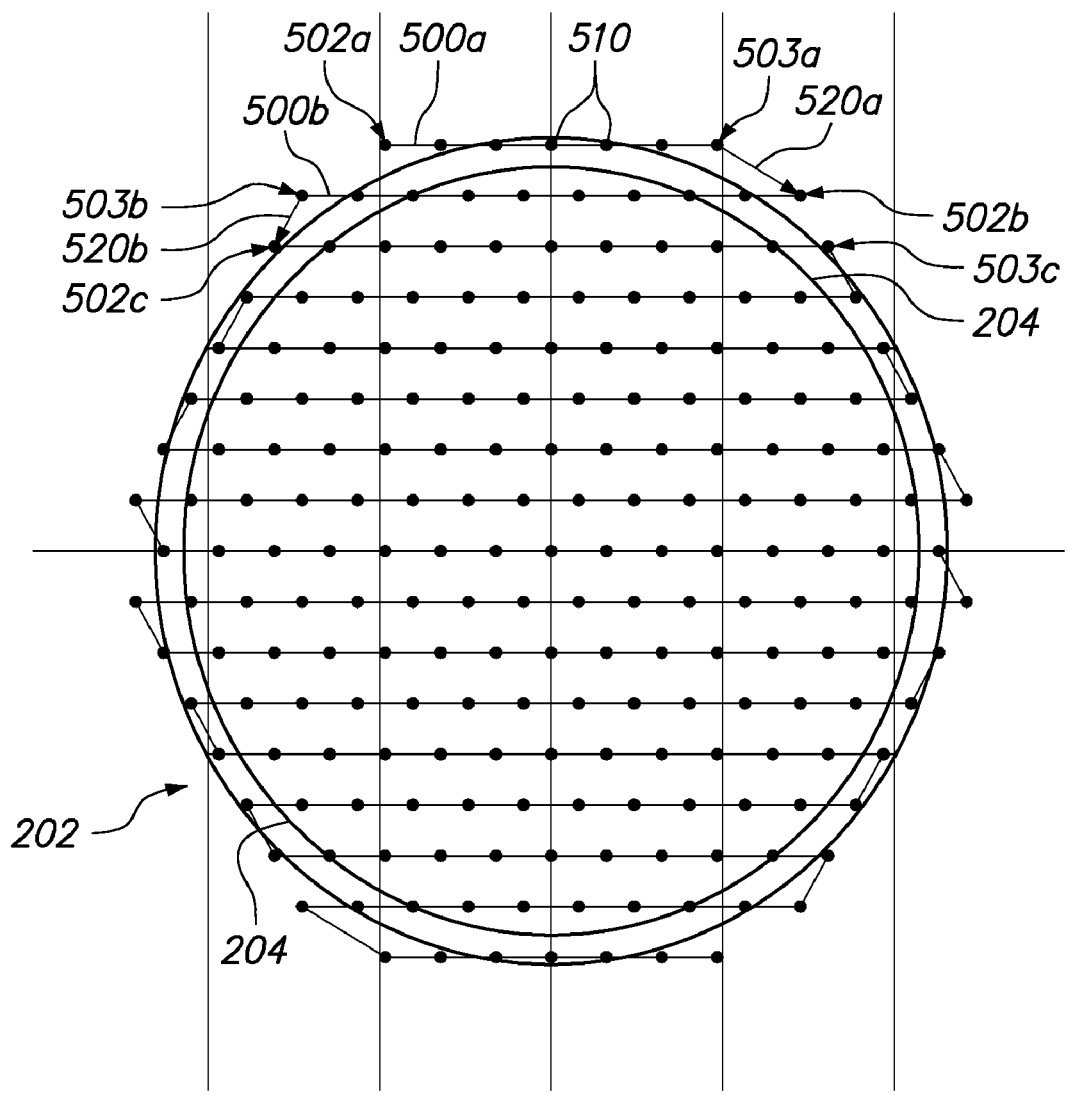
FIG. 5 illustrates a known serpentine pattern for scanning a cell spot.
Figure 6:
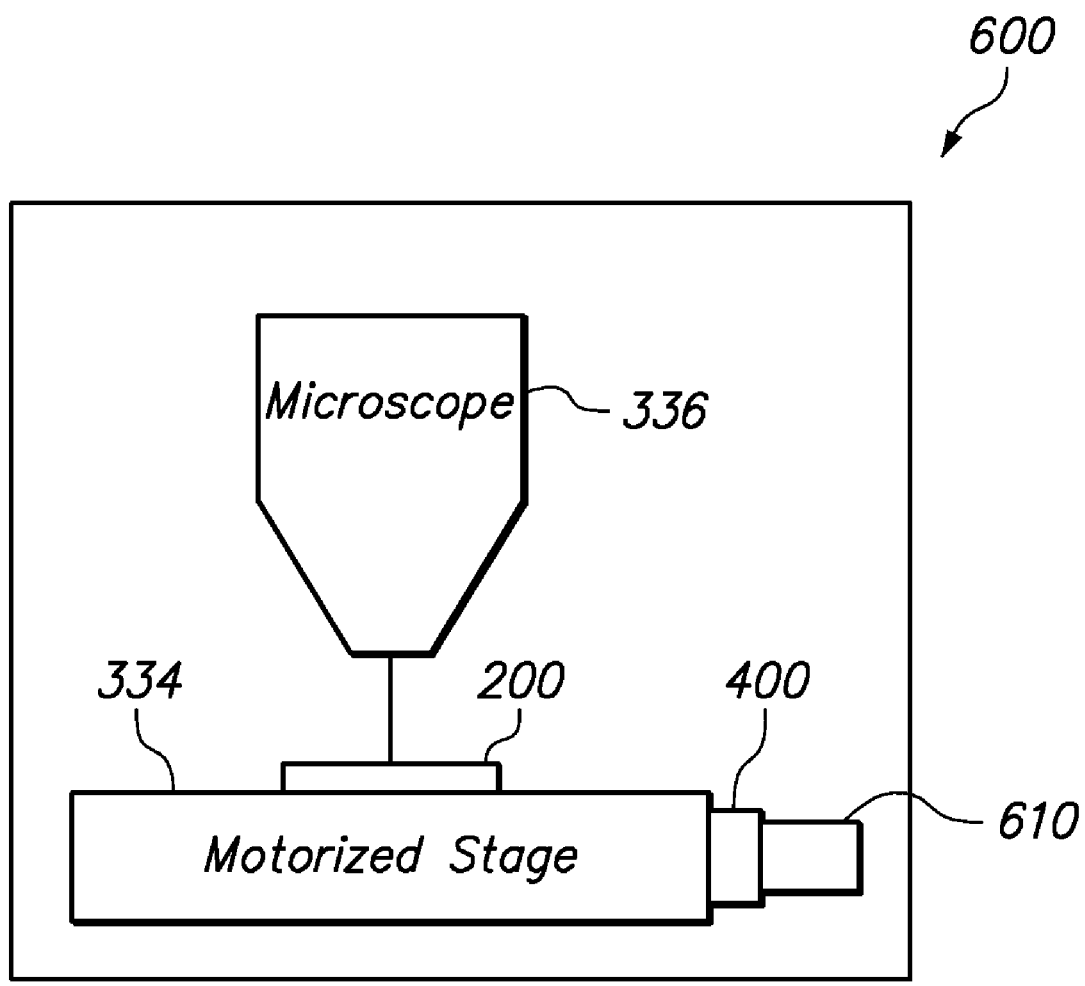
FIG. 6 schematically illustrates a system constructed according to one embodiment that provides manual control over specimen scanning.
Figure 7:
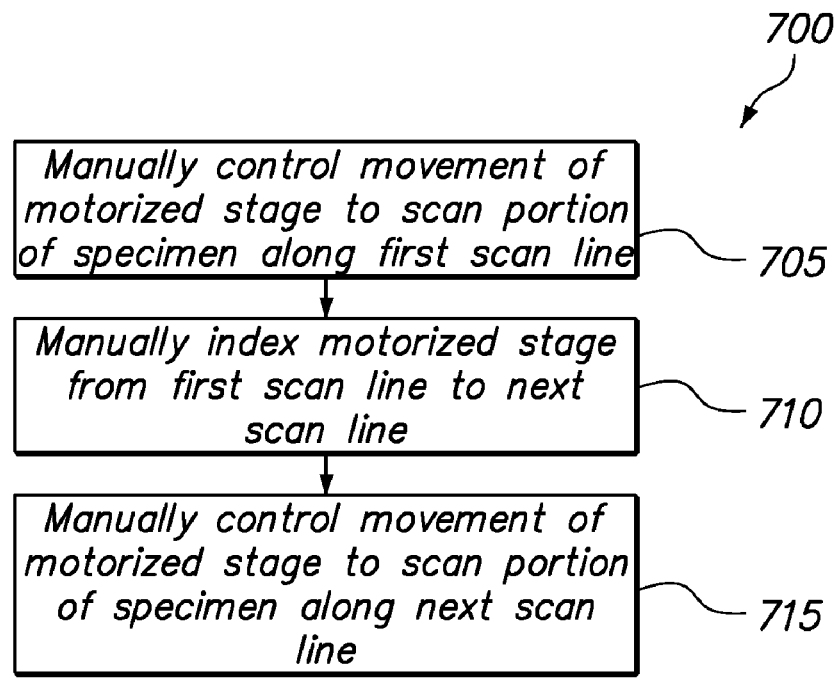
FIG. 7 is a flow chart of a method of manually controlling scanning of a specimen along scan lines and manually indexing between scan lines according to one embodiment.

Referring to FIG. 6, and with further reference to FIG. 7, a scan control system 600 constructed according to one embodiment includes a scan control component or element 610 (generally referred to as scan controller 610) that is connected or operably coupled to a motorized stage 334 of an automated screening system, e.g., the motorized stage of the review station 330 shown in FIG. 3. The scan controller 610 may be connected to the motorized stage 334 through a suitable control interface 400 or other suitable components, e.g., one or more motors 402, a processor 404, and a memory 406 (as generally illustrated in FIG. 4, but not shown in FIG. 6 for ease of explanation). Although FIG. 6 generally illustrates a control interface 400, it should be understood that motor 402, processor 404, memory 406 and other components may be part of other system components, and the control interface 400 is generally illustrated for ease of explanation.

During use, a user manipulates the scan controller 610 to control movement of the stage 334 and the position of the slide 200 and specimen or cell spot 202 thereon during a scanning procedure. System 600 and method 700 embodiments are configured to allow a user to manually control scanning of a first portion of the specimen or cell spot 202 along a first scan line 500 or chord (generally referred to as scan line 500) at step 705, manually control or index 520 the motorized stage 334 to from a current scan line 500 to another scan line 500, e.g., the next or adjacent scan line 500, at step 710, and then continue to manual control movement of the motorized stage 334 to controllably scan a second portion of the cell spot 202 along the second scan line 500 at step 715. FIG. 7 illustrates steps involving scanning along two scan lines, but additional manual indexing and manual scanning steps as shown in FIG. 7 may be performed as necessary to controllably scan additional portions of the cell spot 202 until the entire cell spot 202 has been reviewed. The ability to manually control cell spot 202 scanning along scan lines 510 and indexing 520 is in contrast to known automated scanning systems, which provide little, if any, user control and do not allow a user to control indexing between scan lines.

Figure 1A:
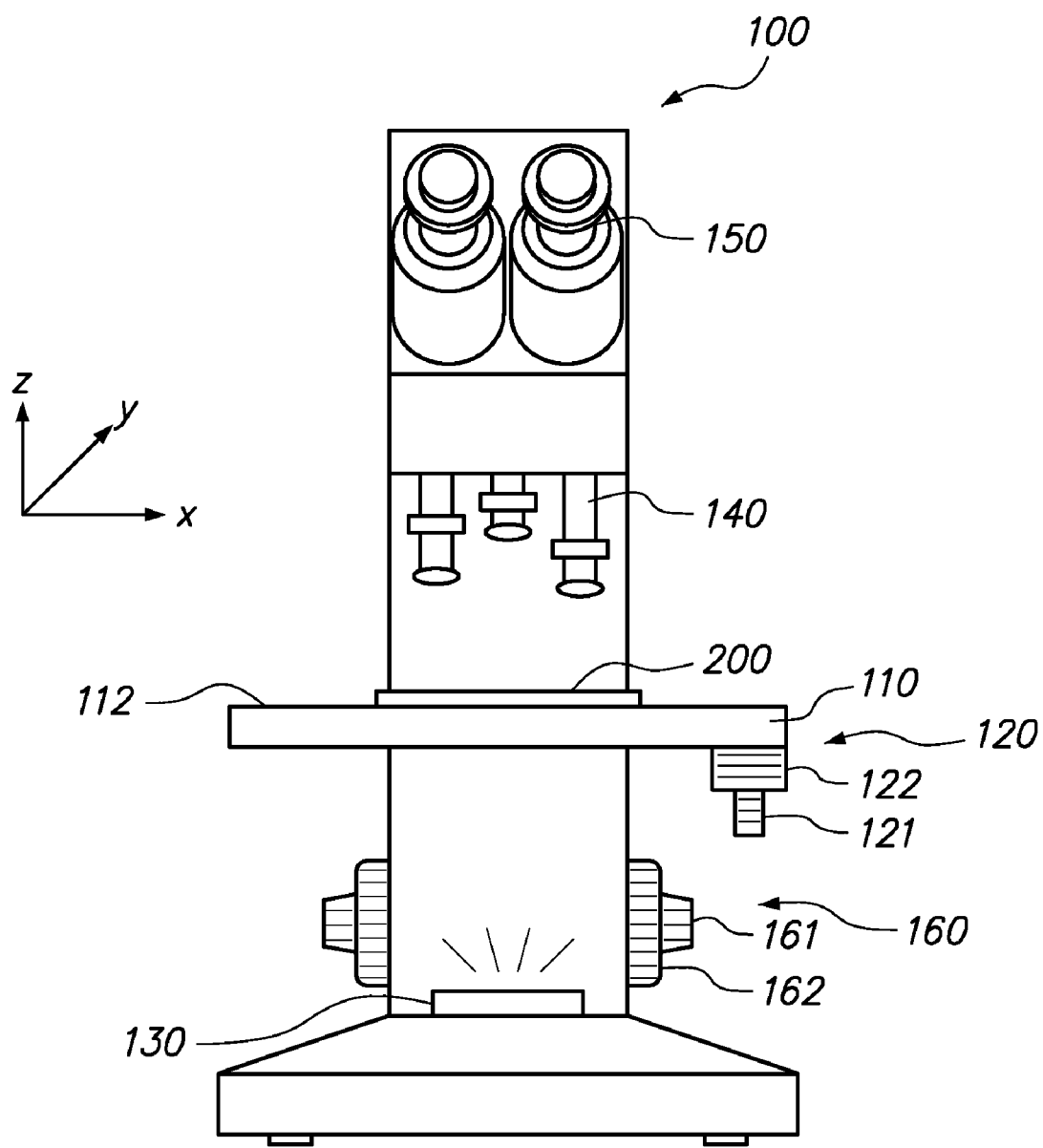
FIG. 1A is a front view of a known microscope.
Figure 1B:
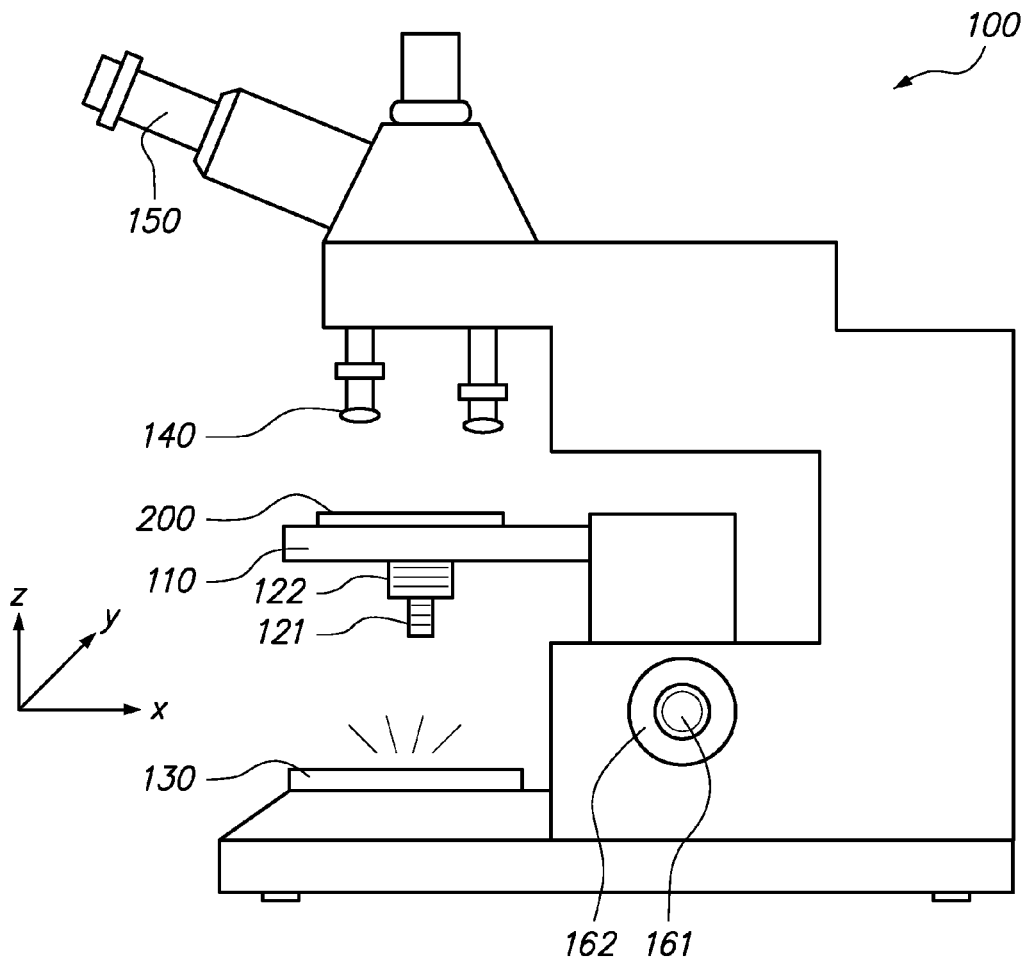
FIG. 1B is a side view of a known microscope.
Figure 2:
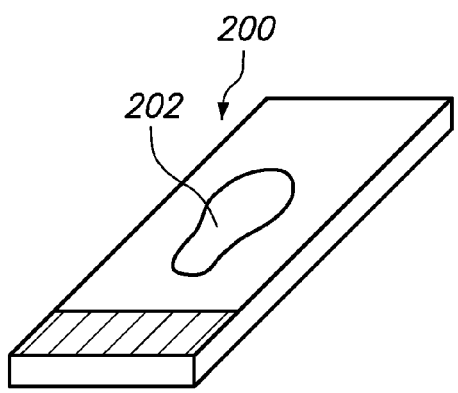
FIG. 2 is a perspective view of a biological specimen slide.
Figure 8:
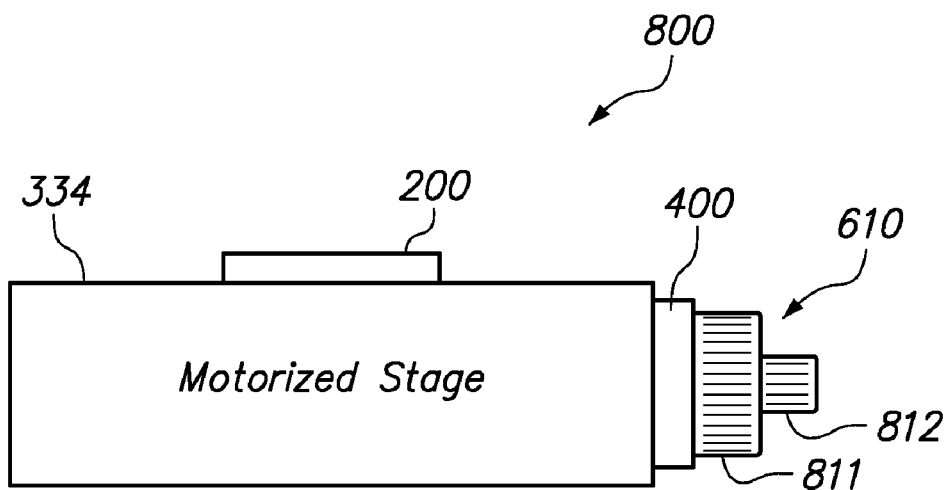
FIG. 8 illustrates a system constructed according to one embodiment including a coaxial controller for manually controlling specimen scanning.

FIG. 8 illustrates a system 800 constructed according to one embodiment having a scan controller 610 in the form of a coaxial rotary controller that includes first and second rotary control elements 811, 812, which may be similar to or the same as stage control wheels or knobs 121, 122 and focus control wheels or knobs 161, 162 shown in FIGS. 1A-B. One or both of the rotary control elements 811, 812 can be rotated to control movement of the motorized stage 334, the position of the specimen slide 200, and indexing 520 of the stage 334 to another scan line 500.

Figure 9:
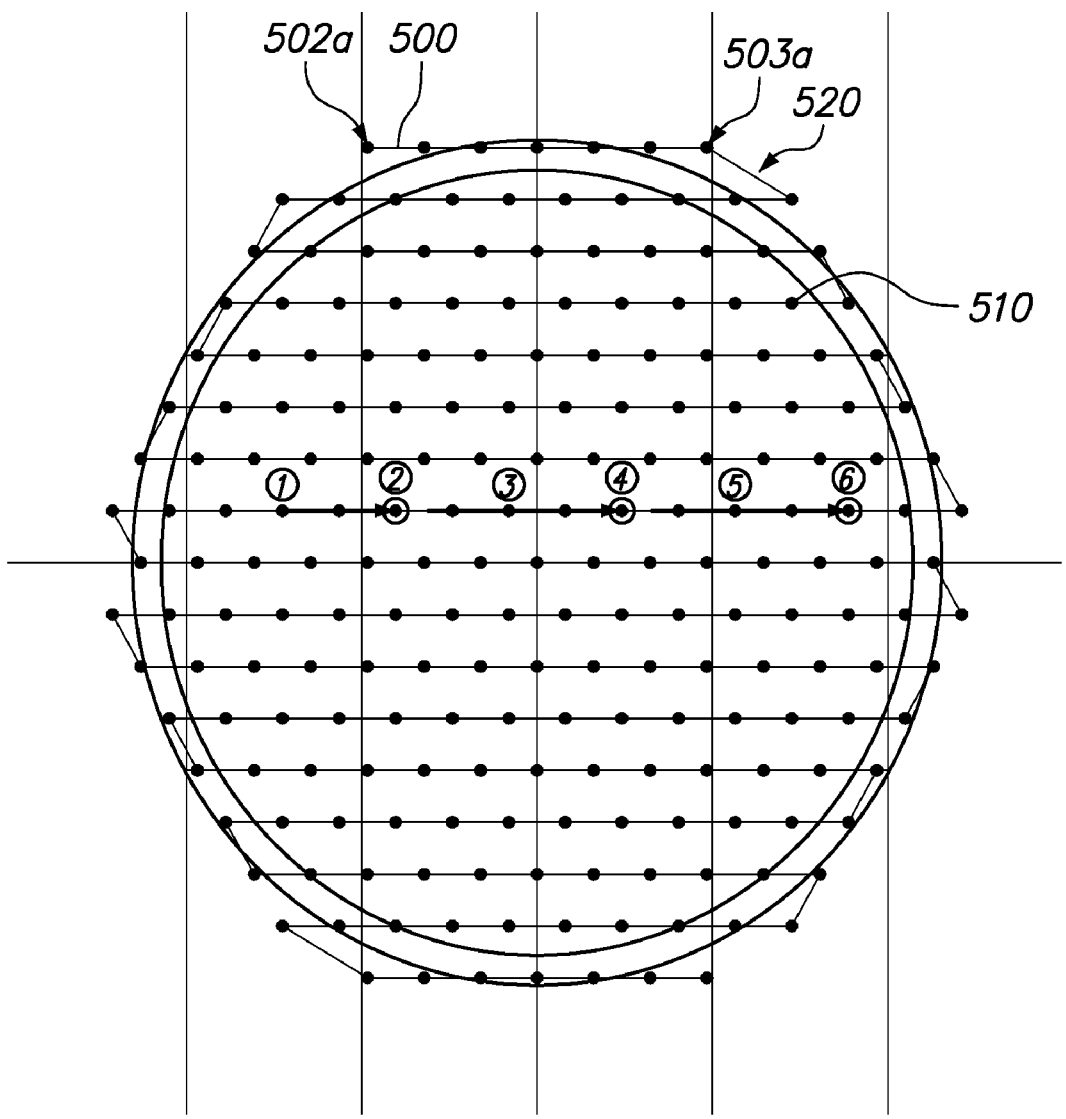
FIG. 9 illustrates an embodiment in which a user selects timing of scanning or when to interrupt scanning and when to resume scanning.

For example, referring to FIG. 9, in one embodiment, a rotary control element, e.g., the outer or larger rotary control element 811, may be rotated by a user to move along different scan positions 510 on a scan line 500 at a pace that is directed and controlled by the user. In the illustrated embodiment, the user can rotate the rotary control element 811 to move from position 510 (1) to position 510 (2), pause at position 510 (2), then rotate the rotary control element 811 to move from position 510 (2), e.g., through position 510 (3), to position 510 (4), where the user may pause again as desired. The user can then continue rotating the rotary control element 811 to move from position 510 (4), e.g., through position 510 (5), to position 510 (6), and so on at the timing and pace selected by the user. In one embodiment, the rotary control element 811 can be configured such that when it is rotated, scanning is performed at a constant speed regardless of the rotational speed of the rotary control element 811, but rotation can be interrupted and resumed as desired to allow the user to stop, start, and resume scanning at his or her discretion.

Figure 10:
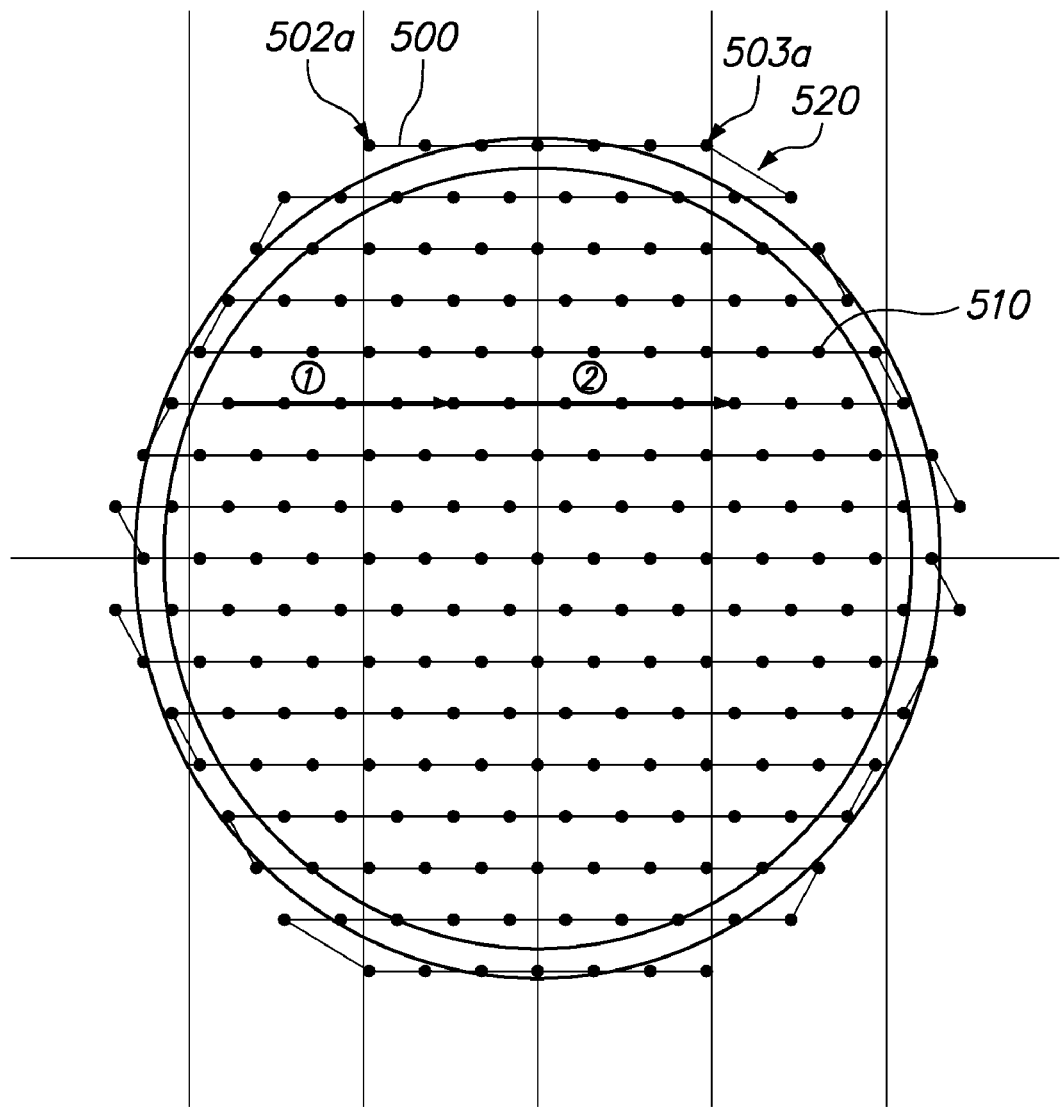
FIG. 10 illustrates an embodiment in which a user selects scanning speed.

Referring to FIG. 10, in an alternative embodiment, the user may also control the speed at which different portions of the cell spot 202 are scanned. According to one embodiment, the speed at which the rotary control element 811 is rotated is related to the speed at which the cell spot 202 is scanned along a particular scan line 500. In the illustrated embodiment, the rotary control element 811 can be rotated at a first rotational speed to scan a first portion of the cell spot 202 along a scan line 500 at a first speed (1), and then the user can rotate the rotary control 811 element more quickly to scan the second portion of the cell spot 202 more quickly at a faster, second speed (2). The rotary control element 811 may also be rotated more slowly to scan the second portion at a slower, second speed.

In another embodiment, system and method embodiments involve a combination of embodiments shown in FIGS. 9 and 10. Thus, in this embodiment, the user may start and stop scanning as desired (as shown in FIG. 9), and may also move through different positions 510 on the scan line 500 at different speeds (as shown in FIG. 10).

Figure 11:
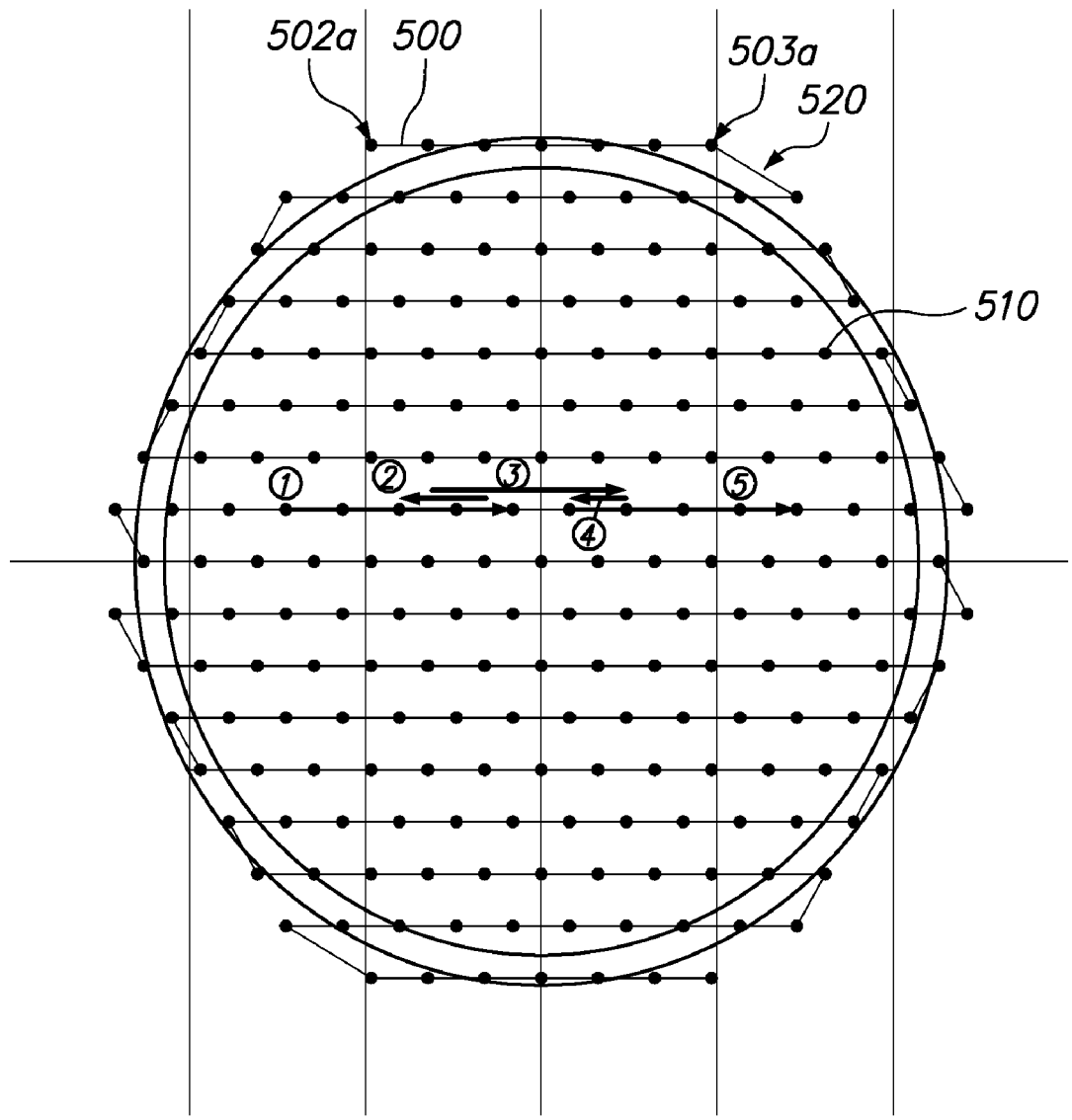
FIG. 11 illustrates an embodiment in which a user selects scanning along a single scan line in multiple directions.

Referring to FIG. 11, in another embodiment, the rotary control element 811 may be controllably rotated by a user to perform multi-directional scanning. In the illustrated embodiment, the user may rotate the rotary control element 811 in one direction (e.g., counter-clockwise) to advance the scan in a first direction (1), and then rotate the same control element 811 in another direction (e.g., clockwise) to reverse the scan direction (2). Scan directions can be changed as desired by the user by rotating the rotary control element 811 in different directions, such that scanning may be advanced (3, 5) and reversed (4) as desired. In this manner, the user controls and selects the specific position 510 to be scanned, and when, and in which direction, the scan should proceed. With these capabilities, embodiments advantageously allow a user to controllably review a portion of the specimen that was previously reviewed to compare that portion to a portion that is currently being reviewed, which is not possible with known automated screening systems. This embodiment may also be combined with the one or more or all of the embodiments shown in FIGS. 8-10 such that the user may control the direction, position and/or speed of the cell spot 202 scan.

Figure 12:
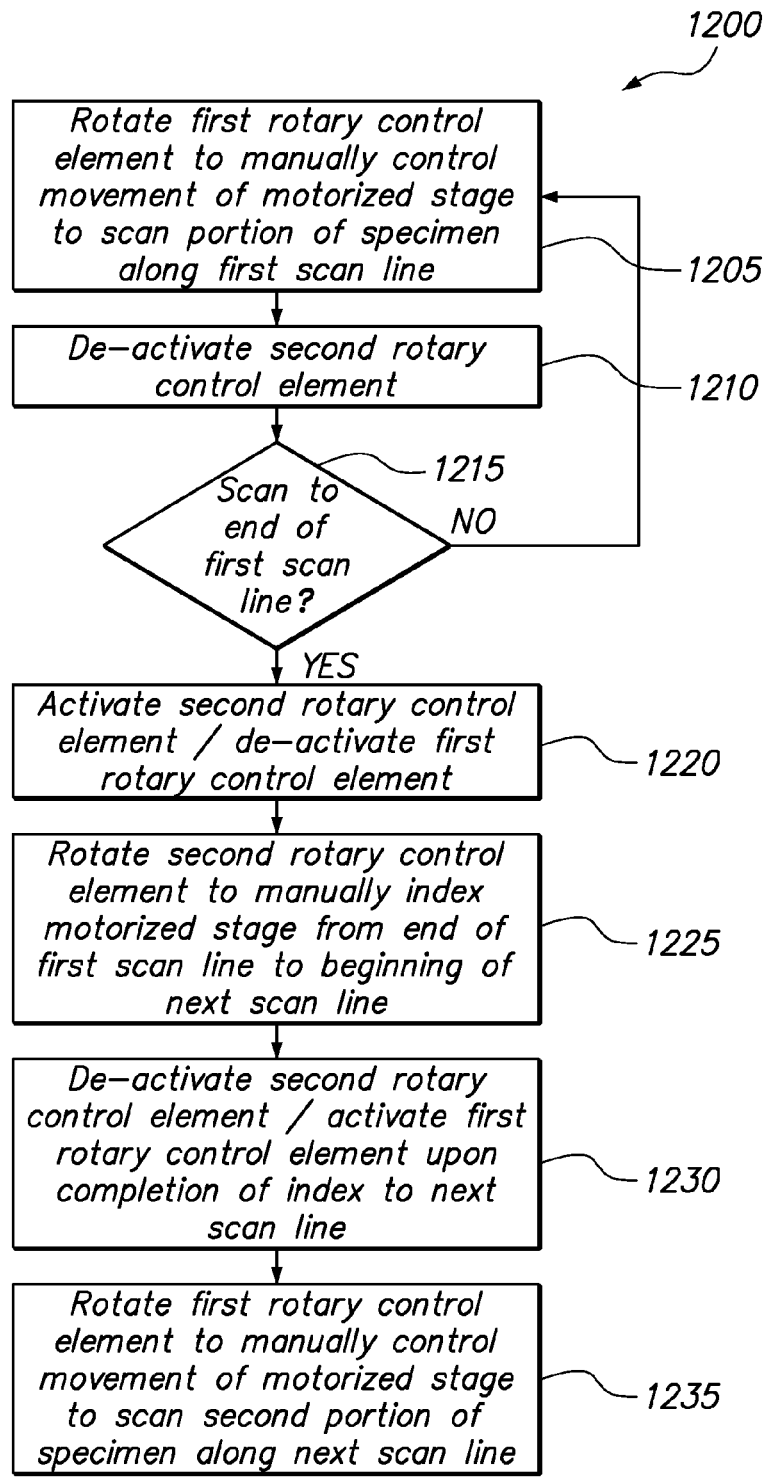
FIG. 12 is a flow chart of a method of manually controlling specimen scanning by selectively enabling and disabling scan control elements.
Figure 13:
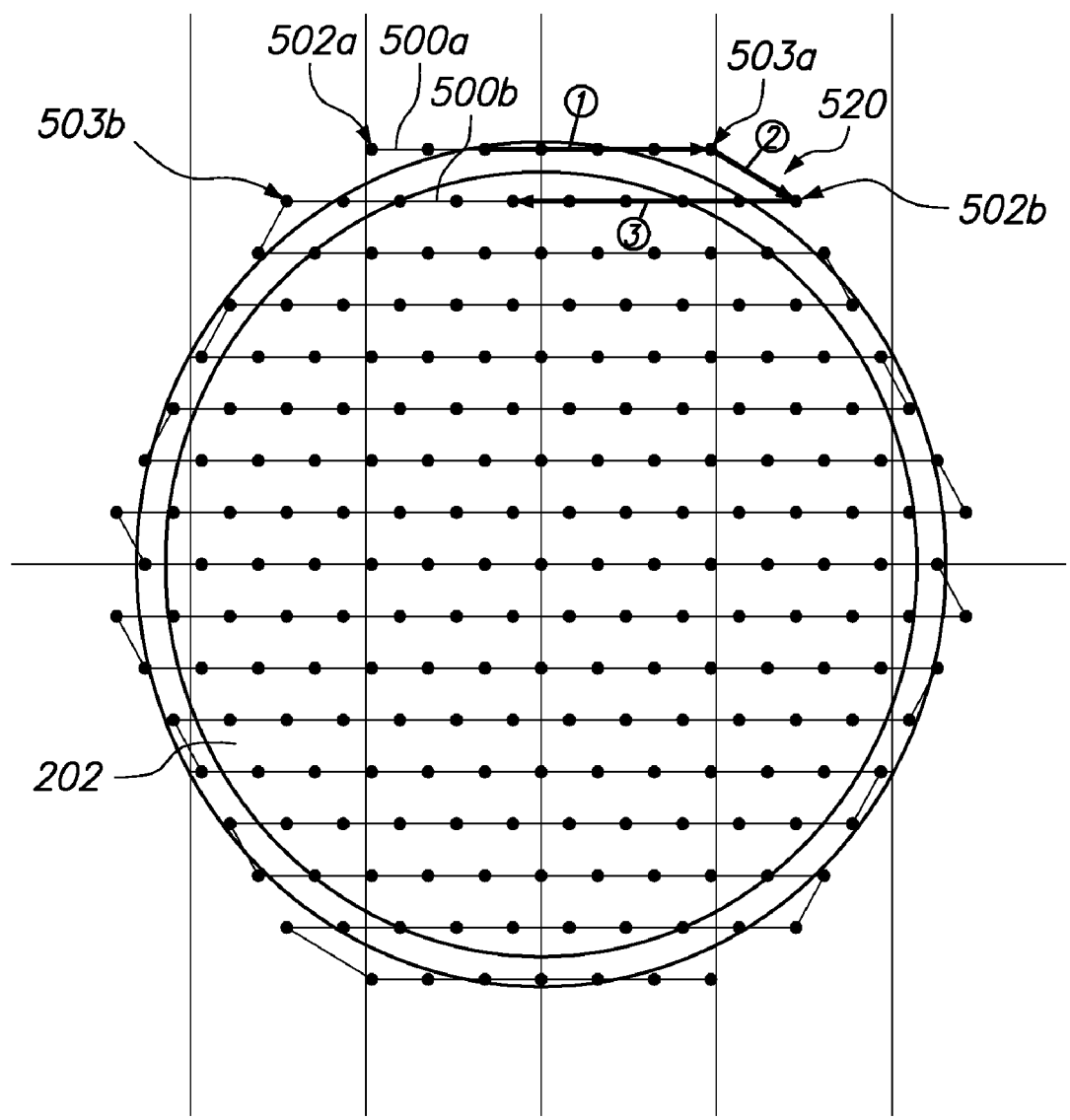
FIG. 13 illustrates manual indexing, according to one embodiment.

Referring to FIGS. 12 and 13, method 1200 of scanning a cell spot 202 according to another embodiment includes manipulating both of the rotary control elements 811, 812 to manually control scanning along scan lines 500 and to manually index 520 to another scan line 500. In one embodiment, at step 1205, e.g., when positioned at the beginning 502 of a scan line 500, one rotary control element, such as the first rotary control element 811, is active or enabled. The rotary control element 811 is rotated by the user to manually control movement of motorized stage 334 and scanning of the cell spot 202 (as described above with reference to FIGS. 6-11). While the other rotary control element 812 may be used for this purpose, reference is made to the first rotary control element 811 for ease of explanation.

During step 1210, the other rotary control element which, in this example, is the second rotary control element 812, is de-activated or disabled. Thus, the second rotary control element 812 cannot be used to index to another scan line 500 while the first rotary element 811 is utilized, and not until the end 503 of the scan line 500 is reached. Thus, in one embodiment, only one of the rotary control elements 811, 812 is active or enabled at a given time. In this manner, embodiments eliminate inadvertent or premature indexing 520 before a particular scan line 500 is completely scanned, thereby ensuring that each scan line 500 is scanned in its entirety, and also to ensure that the scan position is maintained at the end 503 of a scan line 500 such that proper indexing 520 can be performed.

At step 1215, a determination is made whether the scan of the first scan line 500 has been completed. If not, then step 1205 is repeated until the scan is advanced to the end 503 of the first scan line 500. With further reference to FIG. 13, if the first scan line 500 has been completely scanned to the end 503 (1), then at step 1220, the previously de-activated second rotary control element 812 or indexing element is activated or enabled, and the first rotary control element 811 is de-activated or disabled. The enabling and disabling may occur at the same time (e.g. as shown in FIG. 12) or at different times. For ease of explanation, enabling and disabling is shown as a single step 1220.

At step 1225, and with further reference to FIG. 13, the second rotary control element 812 is rotated by the user to manually index 520 (2) the motorized stage 834 from the end 503a of first scan line 500a to beginning 502b of second or next scan line 500b.

At step 1230, the second rotary controller 812 is de-activated, and the first rotary controller 811 is activated or enabled again. As discussed above, this may be done at the same time or different times. At step 1235, and as shown in FIG. 13, the first rotary controller 811 is rotated by the user to control the scan along the next scan line 500b (3). If there are additional scan lines 500, steps of FIG. 12 can be repeated as necessary to controllably scan additional scan lines until the entire cell spot 202 has been reviewed.

Figure 14:
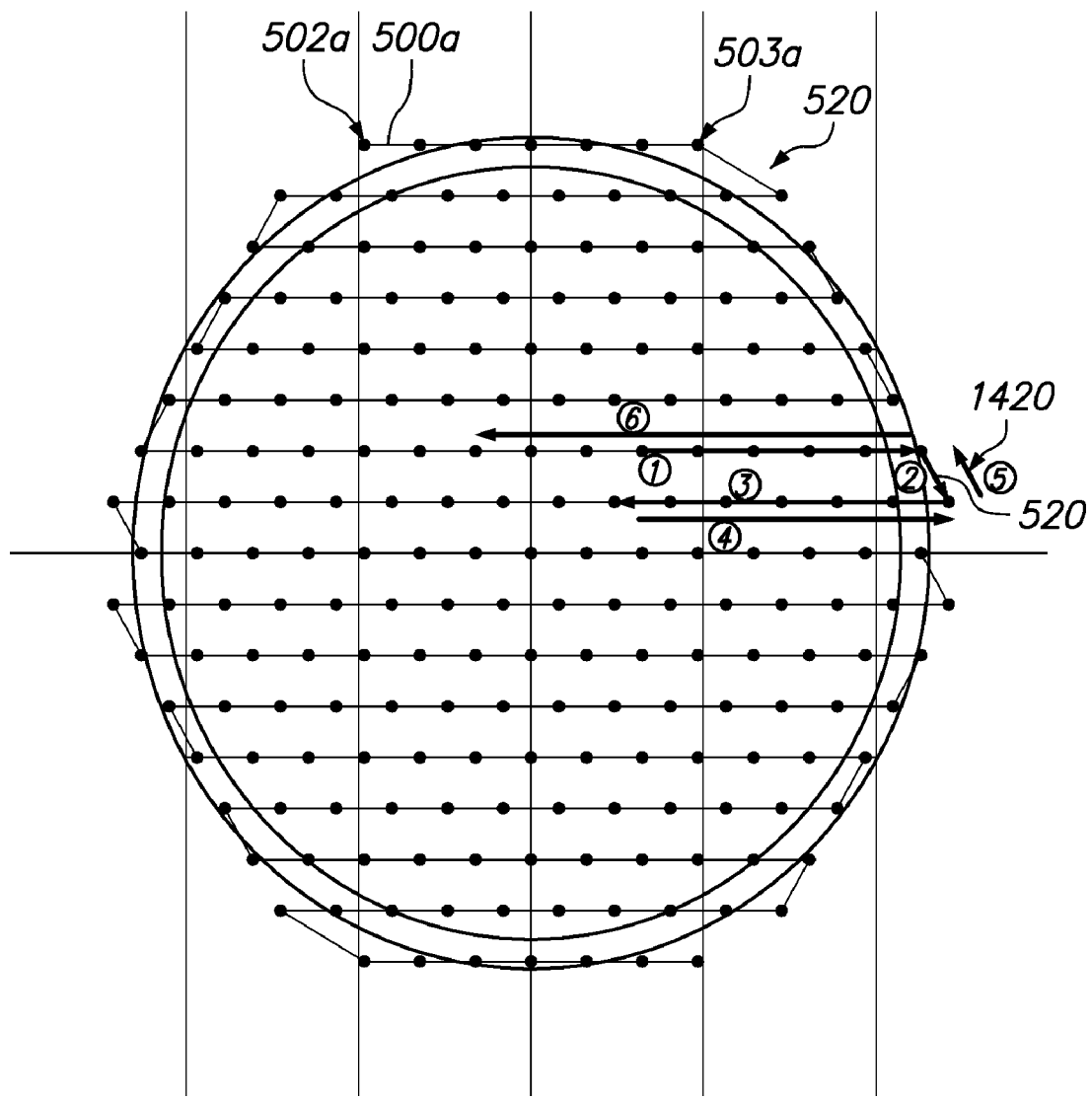
FIG. 14 illustrates manual indexing and manual reverse indexing, according to one embodiment.

FIGS. 12 and 13 illustrate embodiments in which indexing 520 is performed to advance scanning in a forward manner, otherwise referred to as forward indexing. Referring to FIG. 14, in another embodiment, a user may control the second rotary control element 812 for reverse indexing 1420 from a subsequent or "next" scan line 500 to a previous scan line 500. This may be performed by performing certain steps shown in FIG. 12 in a reverse order.

For example, in the embodiment illustrated in FIG. 14, the method 1200 shown in FIG. 12 may be used to advance scanning along various positions 510 (1) to the end 503 of a scan line 500, index 520 (2) down to the beginning 502 of the next scan line 500, and then advance the scan along various positions 510 (3) as described above with reference to FIGS. 12 and 13. At this point, however, the user may want to review a previously viewed portion of a cell spot 202, e.g., to compare that portion to a current specimen portion. With embodiments, the first rotary controller 811 is rotated in an opposite or reverse direction (4) to position the scan back at the beginning 503 of the scan line 500, the first rotary control element 811 can be disabled, and the second rotary control element 812 enabled, then the second rotated control element 812 may be rotated in the opposite or reverse direction to "reverse" index 1420 (5) up to the previous or higher scan line 500. The second rotary control element 812 may then be disabled, and the first rotary control element 811 can be enabled and rotated in an opposite or reverse direction to back-up to the desired scan position (6).

Figure 15:
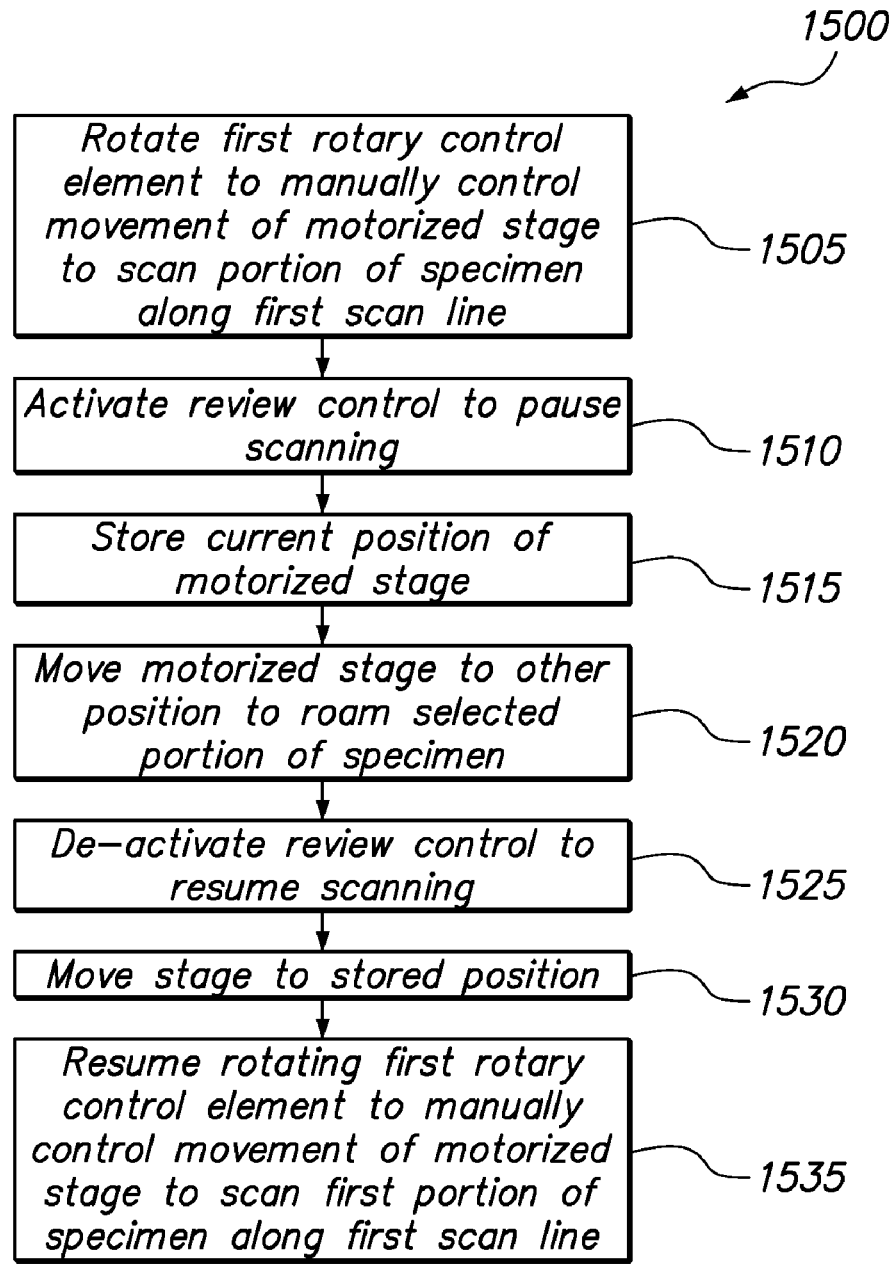
FIG. 15 is a flow chart of a method of scanning and roaming a specimen, according to another embodiment.
Figure 16:
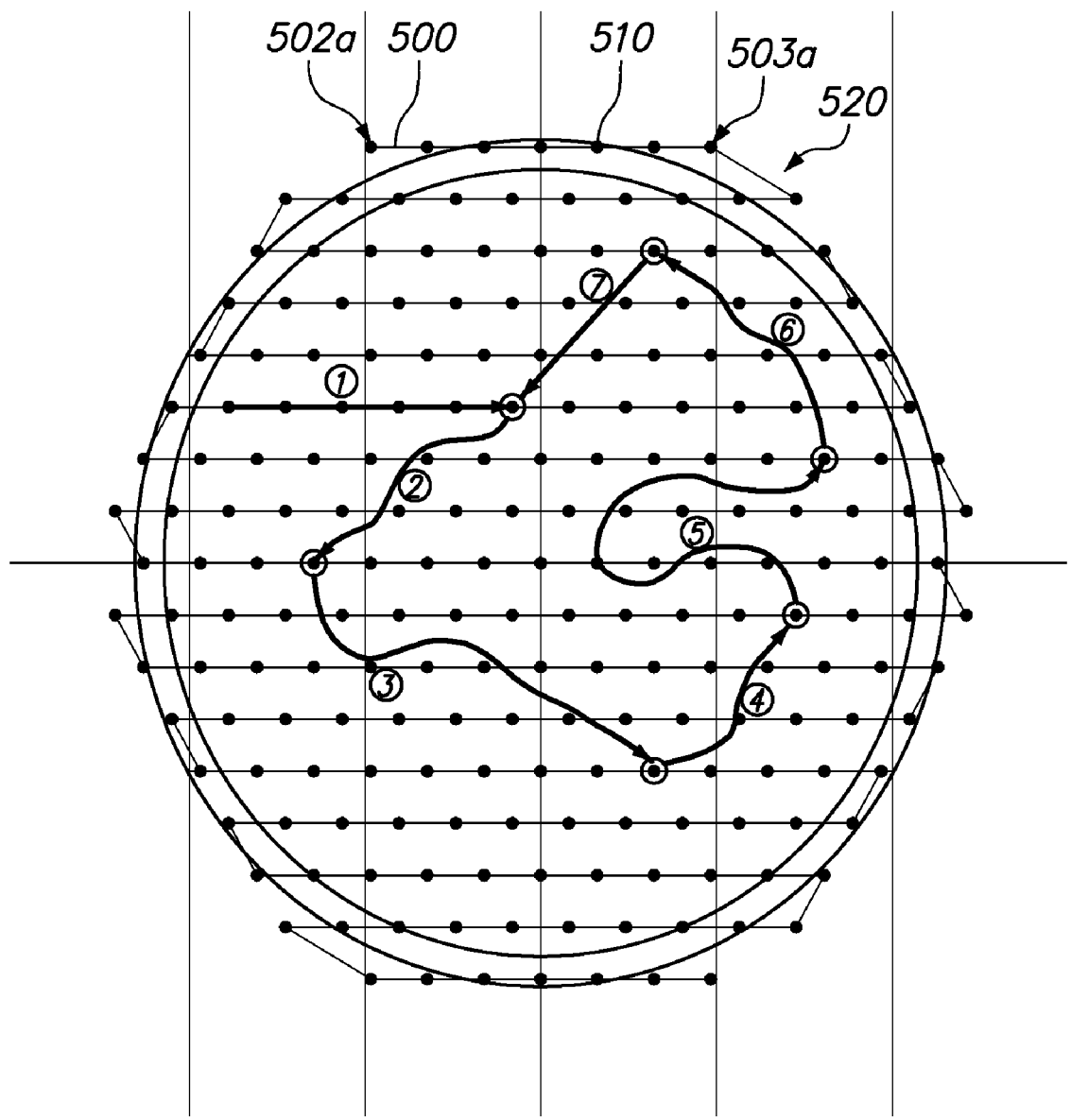
FIG. 16 illustrates one example of roaming across a specimen.

Referring to FIGS. 15 and 16, a method 1500 of scanning a specimen cell spot 202 according to another embodiment permits a user to freely roam or review selected portions of a cell spot 202, while controlling when to return to the position 510 where scanning was paused or interrupted. In the illustrated embodiment, at step 1505, the first and/or second rotary control elements 811, 812 are manipulated by a user (e.g., as described above) to manually control movement of motorized stage 334 along a first or current scan line 500. At step 1510, a user may activate a review control to pause scanning, and the current position 510 of the motorized stage 334 is stored to a memory at step 1515. According to one embodiment, a system is configured such activating a review control is performed by pressing a "NEXT" button. At step 1520, the user is free to move the motorized stage 334 and roam across the cell spot 202 without restriction and without being bound to the current position 510 or the current scan line 500.

For example, FIG. 16 illustrates initially scanning across a scan line 500 (1), and before reaching the end 503 of the scan line 500, at which time the user may activate a review control element, e.g., press a "NEXT" button. The user may then manipulate the first and second rotary control elements 811, 812 to freely roam across the cell spot 202, e.g., along selected paths (2-6) which, in this example, are not on the current scan line 500.

Referring again to FIG. 15, after the user has completed roaming, at step 1525, the review control may be de-activated or disabled (e.g. by pressing the "NEXT" button again) to resume scanning. In the illustrated example, the scan position 510 at the end of roaming is position 510 (6), which is not on the current scan line 500. At step 1530, the stage 343 is automatically moved back to the previously stored position 510 to resume scanning from the same position 510 before the review control was activated. At step 1535, the motorized stage 334 is manually controlled to complete the scan along scan line 500, index 520 to the next scan line 500, scan the next scan line 500, and so on, as described above. If necessary, roaming may be performed again as desired. The embodiments shown in FIGS. 15 and 16 may also be used with one or more embodiments described with reference to FIGS. 9-14.

Figure 17:
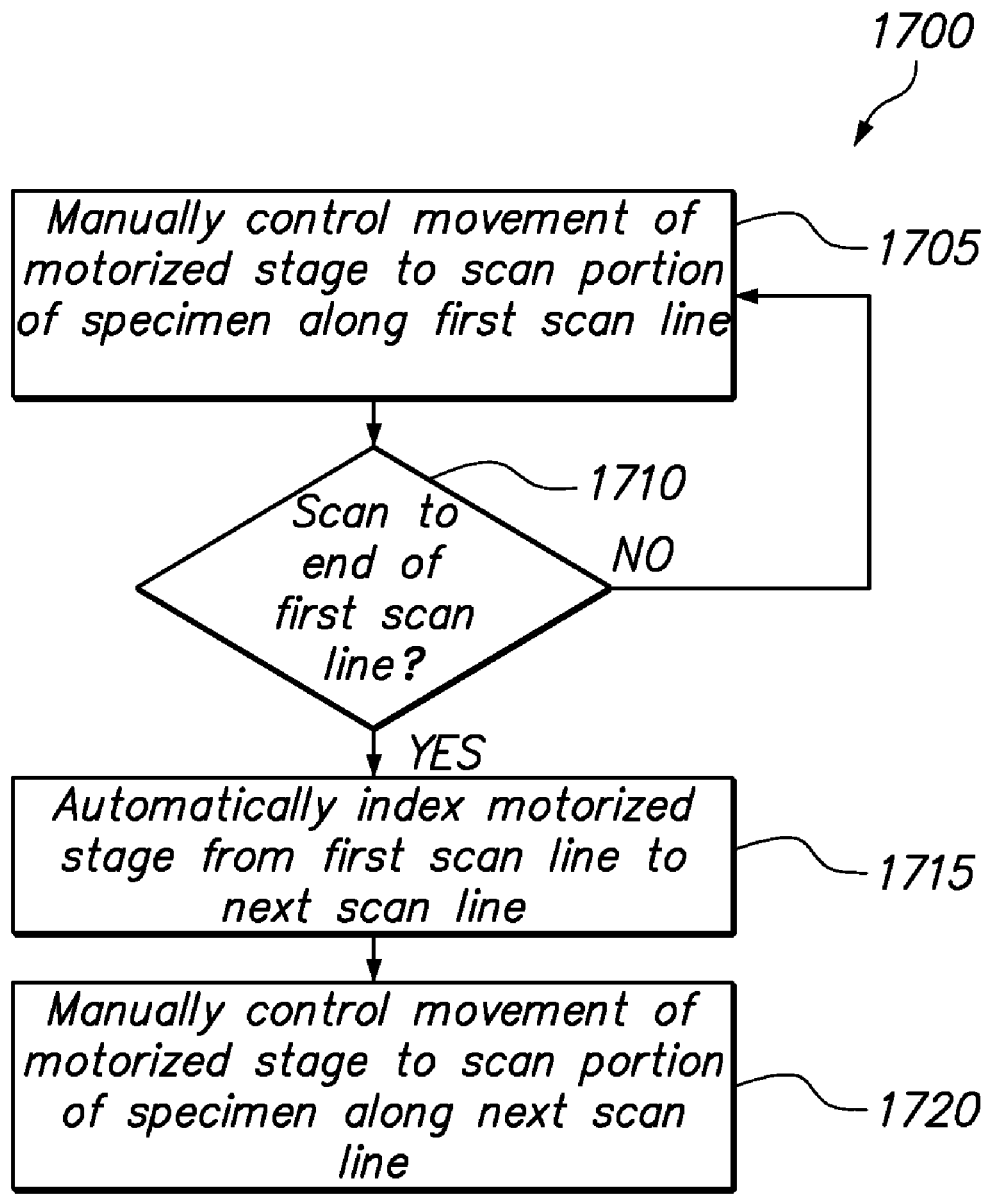
FIG. 17 is a flow chart of a method of manually controlling specimen scanning and automatically indexing to another scan line, according to yet another embodiment.

Embodiments described above involve manual control of scanning along a scan line 500 and manual indexing 520 to another scan line 500. Referring to FIG. 17, another embodiment is directed to a method 1700 of scanning a cell spot 202 that involves manual scanning control (as described above with reference to FIGS. 6-16) and automatic indexing 520 (rather than manual indexing 520). More particularly, at step 1705, scanning of a cell spot 202 along a scan line 500 is manually controlled as described above, and at step 1710, a determination is made whether the scan of the first scan line 500 is completed and has reached the end 503 of the scan line 500. According to one embodiment, step 1710 may be performed by a processor, sensor or other suitable components that monitor the position of the stage 334 to determine whether the end 503 of a scan line 500 has been reached. If not, then steps 1705 and 1710 are repeated until the scan is advanced to the end 503 of the first scan line 500. At step 1715, upon reaching the end 503 of a scan line 500, the motorized stage 334 is automatically indexed from the end of that scan line 500 to the beginning 502 of the next scan line 500 without user input. At step 1720, the first rotary control element 811 may again be rotated to control the scan along the next or second scan line 500 following automatic indexing. Automatic indexing and manual scanning steps may be repeated as necessary until the entire cell spot 202 has been reviewed.

Thus, the embodiment shown in FIG. 17 utilizes a combination of manual and automatic controls, and provides the user the ability to manually control scanning (e.g., as described with reference to FIGS. 6-16 above) without having to manually index the stage 334 to the next scan line.

Although particular embodiments have been shown and described, it should be understood that the above discussion is not intended to limit the scope of these embodiments. Various changes and modifications may be made without departing from the scope of the claims.

For example, although embodiments are described with reference to a coaxial controller that includes rotatable wheels or knobs, the control element for use in controllably scanning specimen portions may be other control components and have other configurations. In another embodiment, the scan controller may be a component that is typically used for controlling specimen review. In one embodiment, rather than using a coaxial controller, the scan controller may be the "NEXT" button, which is normally used for advancing to the next OOI in a sequence of OOIs, or another suitable review control. In this embodiment, the NEXT button could be pressed by the user to manually index from one scan line to another scan line. Thus, in one embodiment, manual control may be implemented using both a knob or wheel type device, e.g., a coaxial control element or a component thereof, and a component that is normally utilized for reviewing OOIs.

Figure 18:
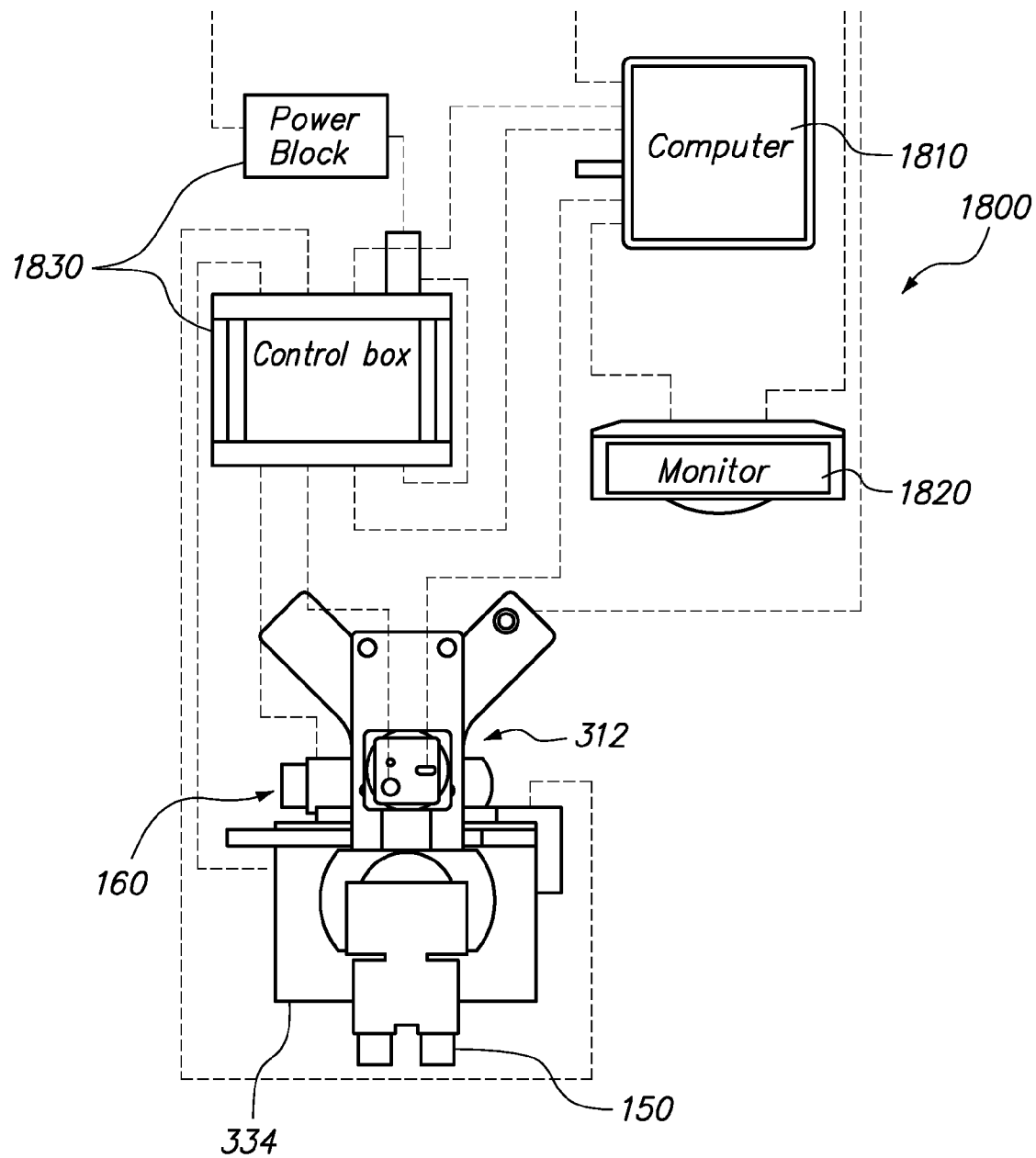
FIG. 18 illustrates a microscope system in which system and method embodiments for controlling scanning and indexing may be implemented.

Further, although embodiments are described with reference to an example of a motorized stage and use of a coaxial control element, embodiments can be utilized in various types of review systems and devices that are utilized for scanning. For example, referring to FIG. 18, embodiments may be implemented in various types of imaging and review systems, one example of which an integrated imaging/review microscope system 1800 that is configured to perform specimen imaging and to allow a user to review OOIs identified as a result of specimen imaging. With the system 1800 shown in FIG. 18, the same microscope may be used for imaging and reviewing individual biological specimens, one slide 200 at a time using a computer 1810, monitor or display 1820 and associated control components 1830.

Moreover, although embodiments are described with reference to horizontal scanning of a specimen cell spot, embodiments may be used with vertical scanning or scanning at different angles.

Further, although embodiments are described with reference to manually controlling scanning utilizing a coaxial controller, other embodiments may use other types of controllers. For example, a scroll wheel, e.g., a scroll wheel on a review control element, may be utilized according to another embodiment.

Embodiments may be implemented in various other ways than the examples described above. Thus, embodiments are intended to cover alternatives, modifications, and equivalents that fall within the scope of the claims.

What is claimed is:

1. A system for scanning a cytological specimen, comprising:
    a motorized stage configured to support a cytological specimen slide;
    a processor operatively coupled to the motorized stage; and
    a scan controller operatively coupled to the processor,
    the motorized stage, the processor, and the scan controller being configured such that manipulation of the scan controller provides
        manual control of movement of the motorized stage along a first scan line to controllably scan a first portion of the cytological specimen slide along the first scan line, and
        manual control of movement of the motorized stage along the second scan line to controllably scan a second portion of the cytological specimen slide along the second scan line, the processor and the scan controller being further configured such that the motorized stage is automatically indexed from the first scan line to the second scan line between manually controlled scans of the cytological specimen slide along the first and second scan lines,
    wherein the scan controller is a coaxial controller comprising a first rotary control element that is rotatable, when enabled, to manually control movement of the motorized stage along the first and second scan lines, and a second rotary control element coaxial with the first rotary control element, the second rotary control element being rotatable, when enabled, to manually index the motorized stage, and
    wherein the processor is configured to disable the second rotary control element during manual control of movement of the motorized stage.

2. The system of claim 1, wherein the processor is configured to detect that the motorized stage has been manually positioned at an end of the first scan line and enable the second rotary control element when in a disabled state, the second rotary control element being rotatable to index the motorized stage from the first scan line to the second scan line.

3. The system of claim 1, further comprising a review controller operatively coupled to the processor.

4. The system of claim 1, wherein the scan controller comprises a review controller operatively coupled to the processor, the review controller including at least one button that can be pressed to manually index the motorized stage.

5. The system of claim 4, wherein the review controller is configured to (i) temporarily suspend scanning of the cytological specimen at a current motorized stage position, and (ii) manually review a selected portion of the cytological specimen at another motorized stage position.

* * * * *